UNITED STATES PATENT OFFICE.

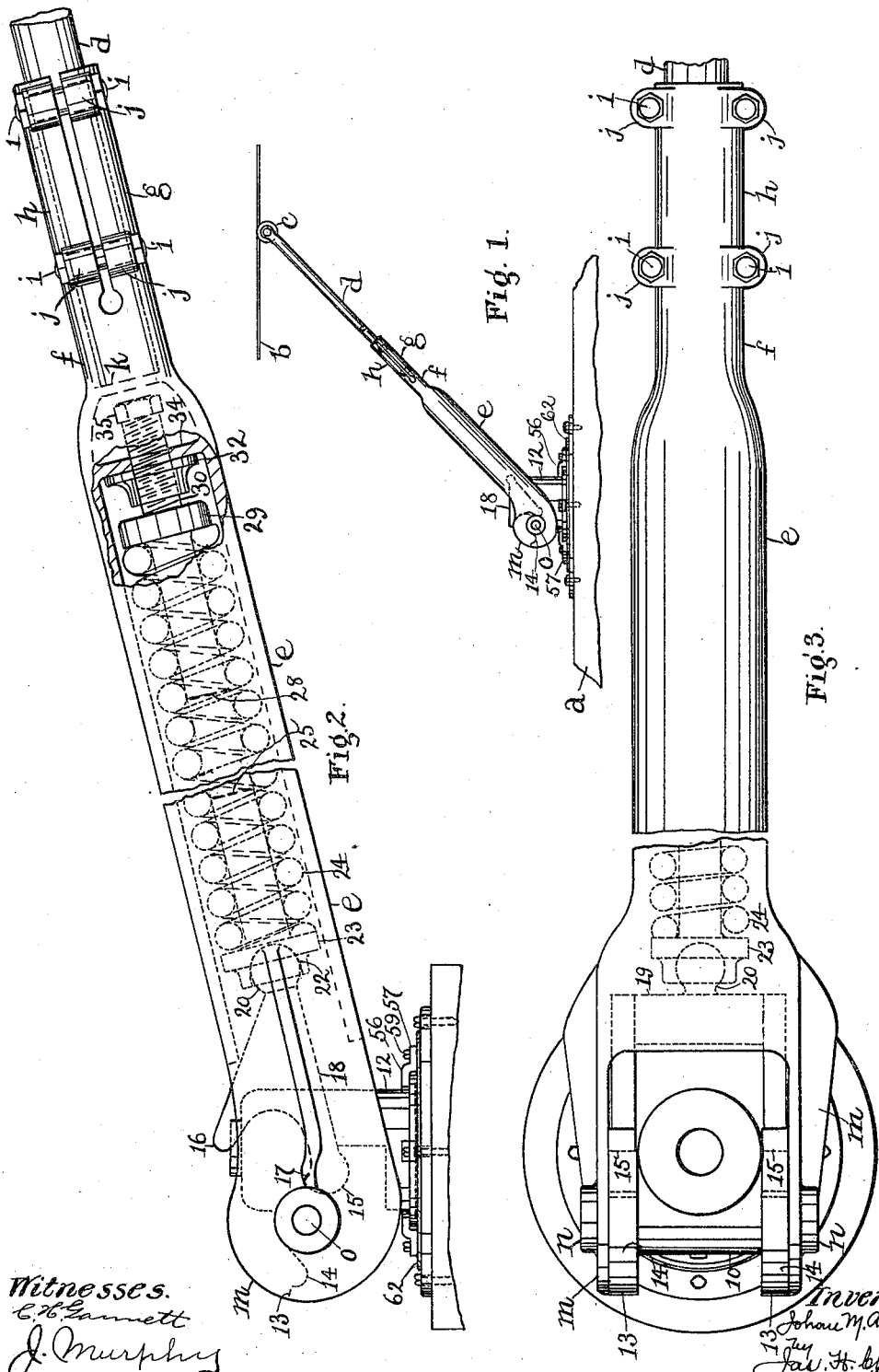

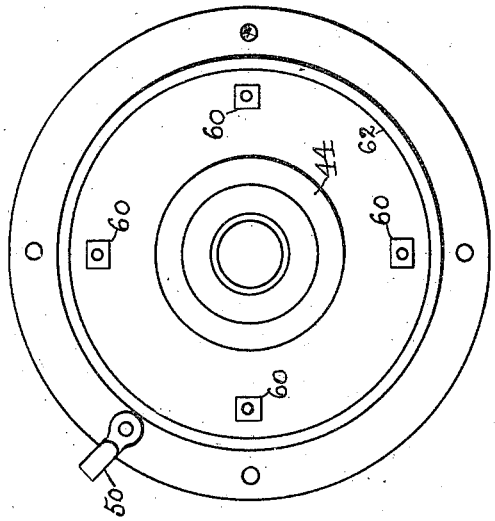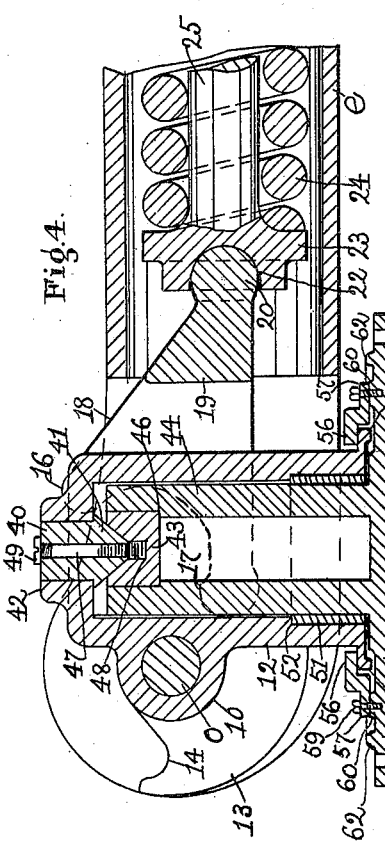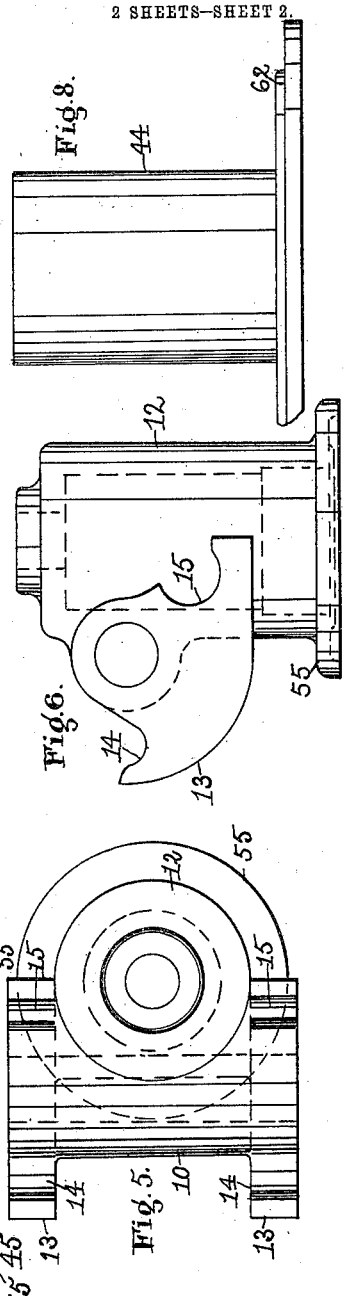

JOHAN M. ANDERSEN, OF BOSTON, MASSACHUSETTS, ASSIGNOR TO ALBERT AND J. M. ANDERSON MANUFACTURING COMPANY, OF BOSTON, MASSACHUSETTS, A CORPORATION OF MAINE.

TROLLEY-POLE SUPPORT.

1,078,762.      Specification of Letters Patent.      Patented Nov. 18, 1913.

Application filed June 21, 1909. Serial No. 503,278.

*To all whom it may concern:*

Be it known that I, JOHAN M. ANDERSEN, a citizen of the United States, residing in Boston, county of Suffolk, and State of Massachusetts, have invented an Improvement in Trolley-Pole Supports, of which the following description, in connection with the accompanying drawings, is a specification, like letters on the drawings representing like parts.

This invention relates to a trolley pole and its support for use on the overhead system of electric railways.

The present invention has for its object to provide a simple, neat and efficient construction of the trolley pole and its supporting base, with which a substantially uniform pressure of the spring upwardly against the trolley wire is obtained at all angular positions of the trolley pole, and with which a swiveling movement of the trolley pole is obtained with a minimum amount of friction without the employment of roller or ball bearings.

Another feature of the invention consists in providing for the employment of the spring which presses the trolley pole upward, as a cushioning medium for the trolley pole in case the trolley wheel leaves the trolley wire.

Provision is also made for protecting the bearing for the swiveling head against moisture and for automatically lubricating the said bearing.

These and other features of this invention will be pointed out in the claims at the end of this specification.

Figure 1 is a side elevation of a sufficient portion of an electric car provided with a trolley pole and base embodying this invention, to enable the same to be understood. Fig. 2, a side elevation on an enlarged scale of the trolley base and a portion of the trolley pole. Fig. 3, a detail in plan to be referred to. Fig. 4, an enlarged vertical section of the trolley base and a portion of the pole and its spring. Fig. 5, a detail in plan to be referred to. Fig. 6, a detail in side elevation to be referred to. Figs. 7, 8 and 9, details to be referred to.

Referring to the drawings, $a$ represents an electric car of any suitable or usual construction, which is employed on the overhead system of electric railways, and $b$ the overhead trolley wire with which a trolley wheel $c$, journaled in the upper end of a trolley pole $d$, makes an under running contact.

The trolley pole $d$ has its lower end inserted into the socketed end of a holder for said pole, which holder is preferably made as herein shown and consists of a hollow body portion $e$ having at one end a neck portion $f$, which is split or slotted longitudinally for a portion of its length from its free end toward the tubular body portion $e$ to form clamping jaws $g$, $h$, which are firmly engaged with the trolley pole $d$ by means of bolts or screws $i$ extended through ears $j$ integral with said jaws. The neck portion $f$ may be provided with an inwardly extended flange $k$ to form a seat for the trolley pole to bear against. The hollow body portion $e$ is provided at its opposite end with forks or arms $m$, which are designed to straddle a head to be hereinafter described and which is mounted to pivot or swivel in a substantially horizontal plane. The forked arms $m$ are provided as shown with hubs or bosses $n$ through which is extended a horizontal pivot pin $o$ having bearings in a hub or boss 10 on the swiveling head above referred to and which consists as herein shown of a cylinder 12 open at its lower end and closed at its upper end, said hub or boss 10 having extended from its opposite sides arms 13 provided with concavities or curved sockets 14 in their upper surfaces on one side of the boss 10 and concavities or curved sockets 15 on the other side of the boss 10 as clearly shown in Fig. 6. The curved sockets 14, 15 in the arms 13 have coöperating with them correspondingly curved fingers 16, 17, on arms 18 of a yoke-shaped device 19, which is located between the forked arms $m$ of the trolley holder, and which has a substantially central rounded pivotal projection 20 adapted to fit into a socket 22 (see Fig. 4) formed in a head 23 of a bearing member for a substantially large coiled spring 24, which is located within the tubular hollow body portion $e$ and has its lower end fitted over a stud or pin 25 extended from the head 23 of said bearing member.

The upper or outer end of the coiled spring 24 is fitted over a stud or pin 28 extended from the head 29 of a bearing member against which the upper end of the said spring presses and forces the head 29 against an adjusting screw 30, by means of which the tension or pressure of the spring 24 may be regulated. The adjusting screw 30 is supported by a threaded nut or collar 32, which is forced by the spring 24 against a partition wall 34 within the body portion e and having a hole through which the screw 30 is loosely extended. The screw 30 is provided with a head 35, which is accessible by means of a socket-wrench or other tool (not shown) after the pole d is removed from the neck portion f of its holder.

By reference to Figs. 1 and 4, it will be seen that the spring 24 is connected with the yoke or device 19 by a knuckle joint, and that the said yoke or device is connected with the swiveling head by a knuckle joint, and it will further be observed that the center of the curved finger 17 is below or off the center of the horizontal pivot o upon which the trolley holder is turned in its vertical movement. It will thus be seen that the trolley pole and its holder turn in an arc having the pin o as a center, and that the spring 24 and the yoke 19, which move with the pole turn on the fingers 17 with the center of the sockets 15 as a center, with the result, that as the pole and its holder approach a substantially horizontal position indicated in Fig. 4, the spring 24 is compressed and its power for lifting the pole is increased, and as the pole approaches a vertical position, the lifting power of the spring 24 diminishes. This increase and decrease in the power of the trolley pole lifting spring 24 is off-set or substantially off-set by variation in the leverage between the center of the pivotal fingers 17 and the pivot pin o in a reverse manner, that is, when the lifting power of the spring is increased as the pole approaches the horizontal position, the leverage is diminished, and when the lifting power of the spring decreases the leverage is increased, so that, the decrease in one is compensated for by an increase in the other and vice versa, with the result that the trolley wheel c is maintained in contact with the trolley wire with a uniform pressure in the different angular positions the pole assumes due to the variation in the height of the trolley wire b.

The lifting power of the spring 24 is due to the fact that one end presses against a fixed abutment, namely, the arms 13 on the swiveling head, at a point off of the center o upon which the trolley pole turns, while the other end of the spring presses against the end of the holder or carrier for the pole, which is free to respond to such pressure and is moved or turned on the pivot o when permitted so to do by the trolley wire.

Provision is made for pivotally supporting the swiveling head 12 and for this purpose the upper end of the said head is provided with a central hole in which is tightly fitted so as to form part of the said head, a stud or pin 40, which is extended into the cylinder or head 12 and is provided at its inner end with a cone 41, which forms one bearing member for said head.

The cone 41 at its base is preferably made of larger diameter than the pin or stud 40 so as to form a shoulder, which engages the under surface of the end 42 of the cylinder or head 12. The conical member 41 is designed to fit into a conical socket or cavity in a coöperating bearing member 43 and both members may be made of hardened steel. The socketed member 43 of the bearing is fitted into a hollow upright or post 44 erected upon a base plate 45, which is designed to be screwed or otherwise fastened to the roof of the car a. The hollow post 44 is enlarged in internal diameter at its upper end so as to form a shoulder 46 to support the socketed member 43. The male member 41 of the conical bearing may and preferably will be provided with a central passage 47 through it, which coöperates with a central cavity 48 in the female member 43 to form an oil well for the reception of sufficient oil or other lubricant to maintain the bearing surfaces of the said members properly lubricated for a substantially long time, as said well is rendered substantially air and liquid tight, by a screw cap or plug 49, which closes the upper end of the passage 47.

It will be observed that the conical bearing member 41 constitutes a pivot point upon which the head 12 swivels, and that the bearing surfaces of the members 41, 43 are inclosed by the said head and are thoroughly protected from dust and moisture, thereby obtaining an easy swiveling head for the trolley pole without the use of roller and ball bearings.

Provision is made for obtaining good electrical connection between the base 45 to which the line terminal 50 is connected, which may be accomplished as herein shown, by means of a ring 51 of phosphor bronze or other good conducting material, which is fitted into the lower end of the cylinder or head 12, which is enlarged on its inner side to form a shoulder 52 against which the ring 51 may be driven, said ring engaging the outer surface of the hollow post or upright 44.

Provision is made for restraining the swiveling head from upward movement, and for this purpose, said head is provided at its lower end with an outwardly extended flange 55, over which projects the flanges 56 or retaining pieces 57, which are secured by screws or bolts 59 to raised projections or lugs 60 distributed on the upper surface of the base substantially 90° apart. The lugs 60 serve to elevate the retaining ring 57 above the base sufficiently to leave a space for the passage of water and oil beneath the ring and beyond the same into a gutter formed by an annular bead 62 on the base coöperating with a raised central portion of said base.

It will be observed that the swiveling head 12 is provided with a single substantially central pivot at its upper end, which is properly lubricated and enables said head to turn with a minimum friction without the necessity of employing ball or roller bearings, which in apparatus of this kind possess objectionable features.

The fingers 16 of the yoke or device 19 coöperate with the curved sockets 14 and act to limit or arrest the trolley pole in its upward movement when the trolley wheel leaves the wire, and said fingers and sockets also act as pivots for the yoke or device to rock on as the trolley pole rebounds when arrested in its upward movement, which rebound is cushioned by the trolley pole lifting spring.

The yoke or device 19 forms a rigid or non-yielding connection between the spring 24 and the head 12, which connection is capable of rocking alternately on the fingers 16, 17, when the trolley wheel leaves the trolley wire and the trolley pole is thrown up violently by the spring 24 until arrested in its upward movement by the fingers 16 engaging the sockets 14. When this upward movement of the trolley pole is arrested as described, the pole rebounds and compresses the spring 24 until the finger 17 again engages the socket 15, whereupon, the spring 24 again elevates the trolley pole until again arrested by the finger 16 engaging the socket 14. This rocking movement continues until the pole finally becomes stationary with the fingers 16, 17 resting in the sockets 14, 15 unless the pole is pulled down by the conductor on the car or by an automatic retrieving device, such as now used largely on trolley cars.

Claims.

1. In an apparatus of the class described, in combination, a supporting base having a hollow upright, a bearing member fitted into the upper end of said upright, a cap or head fitted over said upright and provided with a bearing member which coöperates with the bearing member of the hollow upright to form a pivot upon which the said cap or head turns in a substantially horizontal direction, a trolley pole holder having forks or arms pivotally secured to said cap or head to turn in a substantially vertical direction, arms on said head having curved cavities or sockets on opposite sides of the pivot for said holder, a coiled spring within the holder, a bearing for the outer end of said spring and a forked device having fingers coöperating with the cavities or sockets in said arms and acted upon by said spring to turn one of said fingers in its coöperating socket as the trolley pole holder is turned on its pivot, substantially as described.

2. In an apparatus of the class described, in combination, a base, a hollow upright erected thereon, a bearing member within and supported by the upper end of said hollow upright, a cap or head fitted over said upright and provided with a bearing member which coöperates with the bearing member of the hollow upright to form a pivot upon which the said cap or head turns in a substantially horizontal direction, a trolley pole holder pivoted to said cap or head to turn in a substantially vertical plane, and means movable with said holder to turn it on its pivot to elevate the outer end of said holder, substantially as described.

3. In an apparatus of the class described, in combination, a trolley pole holder pivoted to move in a substantially vertical plane, a head to which said holder is pivoted, arms attached to said head and having recesses or sockets on opposite sides of the pivot for said holder, a forked device provided with arms having fingers coöperating with said recesses to turn therein simultaneously with the movement of the trolley pole holder on its pivot, and a spring interposed between said forked device and said holder and coöperating with both, substantially as described.

4. In an apparatus of the class described, in combination, a trolley pole holder pivoted to move in a substantially vertical plane, a head to which said holder is pivoted having sockets on opposite sides of the pivot for said holder, a spring interposed between the free end of said holder and the pivot for the same and substantially in line with said holder and having a fixed abutment for its upper end, and a rocking device forming a rigid connection between the lower end of said spring and said head and having arms capable of a rocking engagement with the sockets in said head, substantially as described.

In testimony whereof, I have signed my name to this specification in the presence of two subscribing witnesses.

JOHAN M. ANDERSEN.

Witnesses:
 Jas. H. Churchill,
 J. Murphy.